Jan. 13, 1942.  A. DE LOS SINDEN  2,269,558
CONVEYER
Filed May 15, 1940
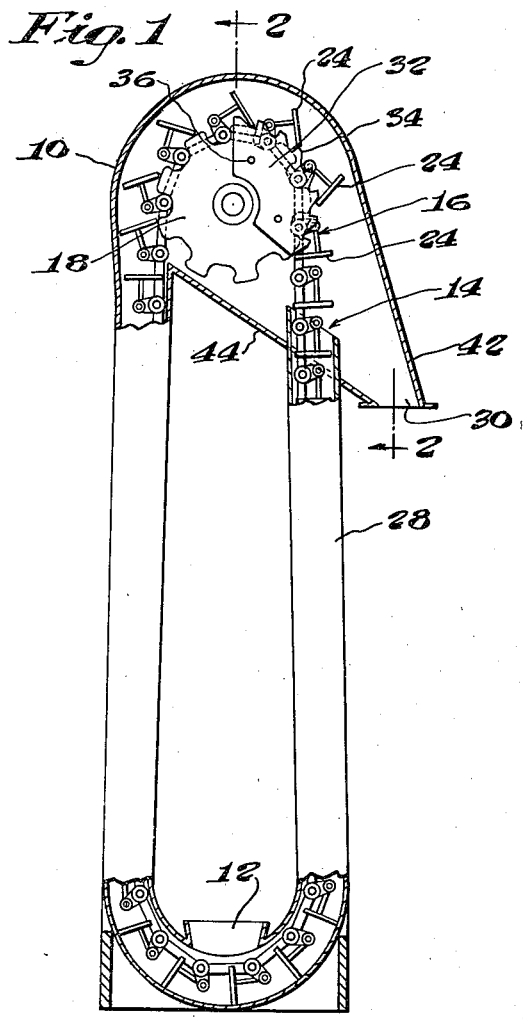
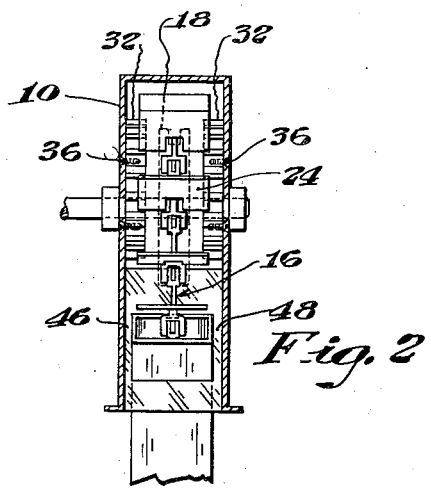
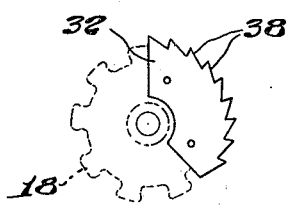
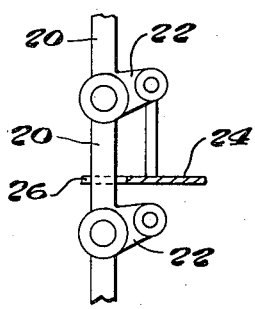
INVENTOR.
Alfred de los Sinden
J. Stanley Churchill
ATTORNEY.

Patented Jan. 13, 1942

2,269,558

UNITED STATES PATENT OFFICE 2,269,558

CONVEYER

Alfred De Los Sinden, Aurora, Ill., assignor to Redler Conveyor Company, Quincy, Mass., a corporation of Massachusetts Application May 15, 1940, Serial No. 335,254

5 Claims. (Cl. 198—170)

This invention relates to a conveyer and more particularly to a conveyer for transporting flowable solid material.

The invention has for an object to provide a novel and improved construction of conveyer of the character specified provided with an endless conveying element having a plurality of substantially solid transverse flight members pivoted thereon and a head sprocket over which the conveying element is arranged to pass and in which provision is made for vibrating or agitating the conveying element as it passes over the head sprocket to the end that material remaining on said flights will be dislodged therefrom and discharged from the conveyer.

With this general object in view, and such others as may hereinafter appear, the invention consists in the conveyer and in the various structures, arrangements and combinations of parts hereinafter described and particularly defined in the claims at the end of this specification.

In the drawing illustrating the preferred embodiment of the invention, Fig. 1 is a side elevation, partly in section, of a conveyer embodying the present invention; Fig. 2 is a detail view in cross-section taken on the line 2—2 of Fig. 1; Fig. 3 is a detail view illustrating a modified form of the vibrating element; Fig. 4 is a view similar to Fig. 3 showing another modification; and Fig. 5 is an enlarged detail view of a portion of the conveying element.

In general, the present invention contemplates an improved construction of a conveyer of the character specified which, while of general utility, is particularly adapted for the conveyance of those solid materials which have a tendency to adhere to the conveying element. Prior to the present invention, in handling materials of this character, it has been found that a certain amount of the material tended to remain on the flight to be carried up over the head sprocket and down the idle or return leg of the conveyer. In accordance with the present invention, provision is made for vibrating or agitating the pivotally mounted solid flight members as they pass over the head sprocket in order to loosen and dislodge any material adhering to the flights. Provision is also made for receiving the material thus dislodged and for discharging it from the conveyer. In practice, the vibrating mechanism may preferably comprise a stationary segmental member disposed adjacent the sprocket and provided with a plurality of raised portions arranged to be successively engaged by the flight members as they pass over the head sprocket.

Referring now to the drawing, see Figs. 1 and 2, the numeral 10 represents a conveyer casing or conduit provided with an inlet 12 and an outlet 14. A conveying element, indicated generally at 16, is arranged to be drawn through the conduit 10 by a head sprocket 18 to convey the material from the inlet 12 to the outlet 14. The conveying element 16 preferably comprises a plurality of connected links 20, each being provided with an extended portion 22 to which a substantially solid flight member 24 is pivotally connected in a manner such as to suspend it in a position to extend transversely of the conveyer casing 10. Each flight member 24 is of a size such as to substantially fill the cross-sectional area of the conduit, and as shown in Fig. 5, each flight is provided with a slotted portion 26 to provide clearance for the links 20.

In operation, the material delivered to the inlet 12 is carried up through the upright leg 28 by the flight members 24 in cooperation with the side walls of the casing, and when the outlet 14 is reached, the bulk of the material carried by the successive flights will flow through the discharge opening 30.

In accordance with the present invention, any material adhering to or carried by the flight members 24 is dislodged therefrom by vibration or agitation of the flights as they pass over the head sprocket 18, and as herein shown, the vibratory action is preferably effected by stationary segmental members 32 disposed substantially concentrically with relation to the head sprocket and provided with a plurality of raised portions 34 arranged to be successively engaged by the pivotally mounted flights 24 during the operation of the conveyer. As herein illustrated, the segmental members 32 may be secured within the casing to the side walls thereof by screws 36. The raised portions 34 of the segmental members may take various forms, the form shown in Fig. 1 comprising spaced ratchet teeth having flattened or concentric portions at the top and bottom of each tooth. The modification shown in Fig. 3 may comprise a segmental member having teeth 38 in the usual form of a ratchet and another modification, see Fig. 4, may comprise a segmental member having rounded portions 40.

Provision is also made for collecting the material thus dislodged by the vibration or agitation of the flights and for discharging it from the conveyer, and as herein shown, the discharge chute 42 disposed adjacent the outlet 14 is provided with a bottom wall 44 which extends upwardly under the head sprocket in a position to receive the material as it is dislodged from the flights in passing thereover. The upright leg 28 preferably extends up through the bottom wall 44 for a short distance and the bottom wall is extended laterally on either side of the leg 28 so as to form lateral passageways 46, 48 upon either side thereof through which the material dislodged is permitted to escape and to pass through the discharge opening.

While the preferred embodiment of the invention has been herein illustrated and described, it will be understood that the invention may be embodied in other forms within the scope of the following claims.

Having thus described the invention, what is claimed is:

1. In a conveyer of the character described, in combination, a conduit having an inlet and an outlet, an endless conveying element traversible therethrough and provided with a plurality of substantially solid flight members pivotally mounted theeron, a head sprocket over which said endless conveying element is arranged to pass, and stationary means disposed adjacent said head sprocket for cooperating with the conveying element to effect vibration and agitation of said pivotally mounted flights as they pass over said head sprocket.

2. In a conveyer of the character described, in combination, a conduct having an inlet and an outlet, an endless conveying element traversible therethrough and provided with a plurality of substantially solid flight members pivotally mounted thereon, a head sprocket over which said endless conveying element is arranged to pass, and means having a plurality of raised portions disposed adjacent said head sprocket and with which said flights successively engage for effecting vibration of said pivotally mounted flights as they pass over said head sprocket and a discharge chute disposed below said head sprocket and in a position to collect and discharge the material dislodged by the vibration.

3. In a conveyer of the character described, in combination, a conduit provided with an upright leg and having a discharge outlet therein, an endless conveying element traversible through the conduit comprising a plurality of connected links each having a substantially solid transverse flight member pivotally attached thereto, a head sprocket over which said conveying element is arranged to pass, a segmental cam piece disposed concentrically with relation to the head sprocket and provided with a plurality of lobes arranged to be successively engaged by said pivotally mounted flight members as they pass over said head sprocket to impart vibration and agitation to the flights and to effect dislodgement of material thereon, and a discharge chute disposed below said head sprocket and in a position to collect and discharge the material dislodged by the vibration.

4. In a conveyer of the character described, in combination, a conduit provided with an upright leg and having a discharge outlet therein, an endless conveying element traversible through the conduit comprising a plurality of connected links each having a substantially solid transverse flight member pivotally attached thereto, a head sprocket over which said conveying element is arranged to pass, a segmental cam piece disposed concentrically with relation to the head sprocket and provided with a plurality of lobes arranged to be successively engaged by said pivotally mounted flight members as they pass over said head sprocket to impart vibration and agitation to the flights and to effect dislodgement of material thereon.

5. In a conveyer of the character described, in combination, a conduit having an inlet and an outlet, an endless conveying element traversible therethrough, a plurality of flight members pivotally mounted on said conveying element, a head sprocket over which said endless conveying element is arranged to pass, and means having a plurality of raised portions disposed adjacent to said head sprocket adapted to be successively engaged by said flights for effecting vibration of said flights as they pass over said head sprocket.

ALFRED DE LOS SINDEN.